(12) United States Patent
Leoni et al.

(10) Patent No.: US 9,709,870 B2
(45) Date of Patent: Jul. 18, 2017

(54) ELECTRONIC PAPER WITH POROUS STANDOFF LAYER

(71) Applicant: HEWLETT-PACKARD DEVELOPMENT COMPANY, L.P., Houston, TX (US)

(72) Inventors: Napoleon Leoni, San Jose, CA (US); Omer Gila, Cupertino, CA (US); Henryk Birecki, Palo Alto, CA (US); Richard Fotland, Franklin, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 31 days.

(21) Appl. No.: 14/788,003

(22) Filed: Jun. 30, 2015

(65) Prior Publication Data
US 2015/0301426 A1     Oct. 22, 2015

Related U.S. Application Data

(63) Continuation of application No. 13/172,202, filed on Jun. 29, 2011, now Pat. No. 9,104,082.

(51) Int. Cl.
 *G02F 1/167*     (2006.01)
 *G02F 1/1333*    (2006.01)

(52) U.S. Cl.
 CPC .......... *G02F 1/167* (2013.01); *G02F 1/13338* (2013.01); *G02F 1/133348* (2013.01)

(58) Field of Classification Search
 CPC ............. G02F 1/167; G02F 2001/1676; G02F 2001/1678; G02F 1/133348
 See application file for complete search history.

(56) References Cited

U.S. PATENT DOCUMENTS

| | | |
|---|---|---|
| 3,668,106 A | 6/1972 | Ota |
| 5,276,438 A | 1/1994 | Disanto |
| 6,222,513 B1 | 4/2001 | Howard et al. |
| 6,407,763 B1 | 6/2002 | Yamaguchi et al. |
| 6,424,387 B2 | 7/2002 | Sato et al. |
| 6,426,827 B1 | 7/2002 | Bonhote et al. |
| 6,515,790 B2 | 2/2003 | Miyamoto et al. |
| 6,573,880 B1 | 6/2003 | Simoni et al. |
| 6,700,695 B2 | 3/2004 | Engler et al. |
| 6,795,228 B2 | 9/2004 | Sacripante et al. |
| 6,822,893 B2 | 11/2004 | Vincent et al. |
| 6,839,158 B2 | 1/2005 | Albert |
| 6,987,503 B2 * | 1/2006 | Inoue ...................... G02F 1/167 |
| | | 204/600 |
| 7,223,672 B2 | 5/2007 | Kazlas et al. |
| 7,256,766 B2 | 8/2007 | Albert |
| 7,408,699 B2 | 8/2008 | Wang et al. |
| 7,442,587 B2 | 10/2008 | Amundson et al. |
| 7,463,400 B1 * | 12/2008 | Tatsuura ................... G02F 1/15 |
| | | 359/265 |
| 7,499,211 B2 | 3/2009 | Suwabe et al. |

(Continued)

*Primary Examiner* — Thienvu Tran
*Assistant Examiner* — Angela Brooks
(74) *Attorney, Agent, or Firm* — Fabian VanCott (57) ABSTRACT

An electronic paper device includes a ground plane, a charge receiving layer, and a porous stand off layer disposed over the charge receiving layer. An active layer is interposed between the ground plane and the charge receiving layer, the active layer including a plurality of microcapsules containing charged pigments. A system for writing information to electronic paper is also provided.

20 Claims, 5 Drawing Sheets

(56) References Cited

U.S. PATENT DOCUMENTS

| | | |
|---|---|---|
| 8,144,388 B2 | 3/2012 | Ogawa |
| 8,169,142 B2 * | 5/2012 | Kawai .................... G02F 1/167 |
| | | 313/582 |
| 8,389,381 B2 | 3/2013 | Amundson |
| 8,493,319 B2 * | 7/2013 | Gila ........................ G02F 1/167 |
| | | 345/107 |
| 8,542,429 B1 * | 9/2013 | Leoni ................... G06K 19/077 |
| | | 235/380 |
| 8,638,492 B2 * | 1/2014 | Chen ....................... G02F 1/167 |
| | | 359/296 |
| 8,830,160 B2 | 9/2014 | Gila |
| 9,104,082 B2 * | 8/2015 | Leoni ...................... G02F 1/167 |
| 2001/0020935 A1 | 9/2001 | Gelbman |
| 2002/0145792 A1 | 10/2002 | Jacobson et al. |
| 2002/0180687 A1 | 12/2002 | Webber |
| 2003/0025855 A1 | 2/2003 | Holman et al. |
| 2004/0263470 A1 | 12/2004 | Sprague et al. |
| 2005/0001810 A1 | 1/2005 | Yakushiji et al. |
| 2005/0134550 A1 | 6/2005 | Schmitz |
| 2005/0259068 A1 | 11/2005 | Nihei et al. |
| 2006/0125778 A1 | 6/2006 | Apte |
| 2007/0002428 A1 | 1/2007 | Liu |
| 2007/0061214 A1 | 3/2007 | Schmitz |
| 2007/0076289 A1 | 4/2007 | Wang |
| 2007/0206270 A1 | 9/2007 | Iwamatsu et al. |
| 2008/0042926 A1 | 2/2008 | Egi et al. |
| 2008/0122219 A1 | 5/2008 | Dunnigan et al. |
| 2008/0186259 A1 | 8/2008 | Todorokihara et al. |
| 2008/0292782 A1 | 11/2008 | Lin |
| 2010/0142027 A1 | 6/2010 | Tatsuura et al. |
| 2010/0248405 A1 | 9/2010 | Tanaka |
| 2011/0032223 A1 * | 2/2011 | Okamoto ................ G02F 1/167 |
| | | 345/204 |
| 2011/0081527 A1 | 4/2011 | Yamato |
| 2011/0210328 A1 | 9/2011 | Yamazaki et al. |
| 2011/0298760 A1 | 12/2011 | Gila |
| 2012/0001889 A1 | 1/2012 | Kimura |
| 2012/0154900 A1 * | 6/2012 | Kim ........................ G02F 1/167 |
| | | 359/296 |
| 2012/0206341 A1 * | 8/2012 | Gila ...................... B41J 3/4076 |
| | | 345/156 |
| 2012/0320001 A1 * | 12/2012 | Gila ........................ G02F 1/167 |
| | | 345/204 |
| 2013/0033488 A1 * | 2/2013 | Takahashi .......... H04N 13/0418 |
| | | 345/419 |
| 2013/0155490 A1 | 6/2013 | Zhang |
| 2013/0179259 A1 * | 7/2013 | Lindauer ................ G06Q 30/02 |
| | | 705/14.52 |
| 2013/0235446 A1 | 9/2013 | Leoni |

\* cited by examiner

ELECTRONIC PAPER WITH POROUS STANDOFF LAYER

BACKGROUND

Electronic paper ("e-paper") is a display technology designed to recreate the appearance of ink on ordinary paper. E-paper reflects light like ordinary paper and may be capable of displaying text and images indefinitely without using electricity to refresh the image, while allowing the image to be changed later. E-paper can also be implemented as a flexible, thin sheet, like paper. By contrast, a typical flat panel display does not exhibit the same flexibility, typically uses a backlight to illuminate pixels, and constantly uses power during the display. Typical e-paper implementations, such as electronic books ("e-books"), include an e-paper display and electronics for rendering and displaying digital media on the e-paper.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

E-paper is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those which are used in printing allows the e-paper to be read at a wide range of angles and lighting conditions, including full sunlight. The use of ambient light also eliminates the need for illumination produced by the device. This minimizes the energy used by the e-paper. Additionally, the e-paper does not use energy to maintain the image. Once the image is written, the image remains on the e-paper for an extended period of time or until the e-paper is rewritten. Thus, a typical e-paper primarily uses energy for changes of state.

E-paper is typically written by generating a charge on a surface in proximity to a layer of microcapsules that contain charged pigment particles. The charge on the surface attracts or repels the charged pigment particles in the microcapsules to create the desired image. The pigment particles are stable within the microcapsules after they are moved into position. However, a wide variety of methods can be used to alter the image or text on the e-paper after it has been written. This can restrict the use of e-paper to applications that do not require the images or text to be secure against alteration. However, the principles described below illustrate a porous standoff layer that prevents alteration of e-paper using common techniques such as an electrified stylus or corona discharge mechanisms. By preventing alteration of the e-paper using easily accessible technology, the security of the e-paper improves and the e-paper can be used a wider variety of applications.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1A:
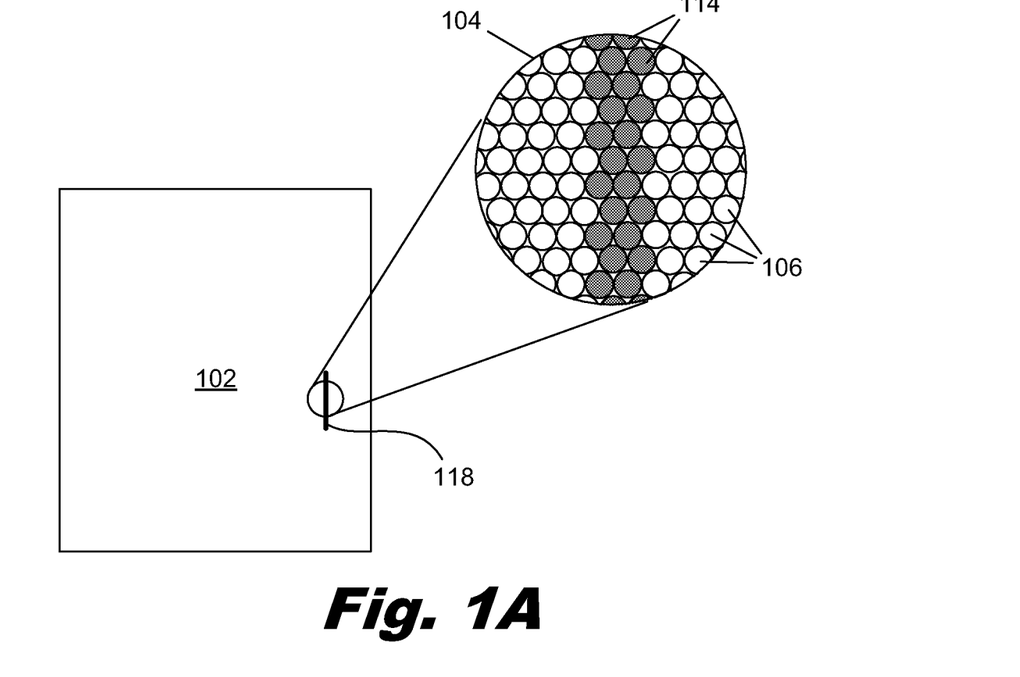
FIG. 1A is a plan view of an illustrative piece of electronic paper, according to one example of principles described herein.

FIG. 1A shows a plan view of an illustrative piece of e-paper 102 and includes an enlargement 104 of a small portion of the e-paper 102. The enlargement 104 shows that this e-paper implementation includes an array of embedded, spherical-shaped microcapsules 106. The line 118 is created by selectively applying a charge to the e-paper 102. The charge moves the particles within the microcapsules 106. In this example, a charge has been applied that moved dark particles to the front of the microcapsules 114 to form the line 118.

Figure 1B:
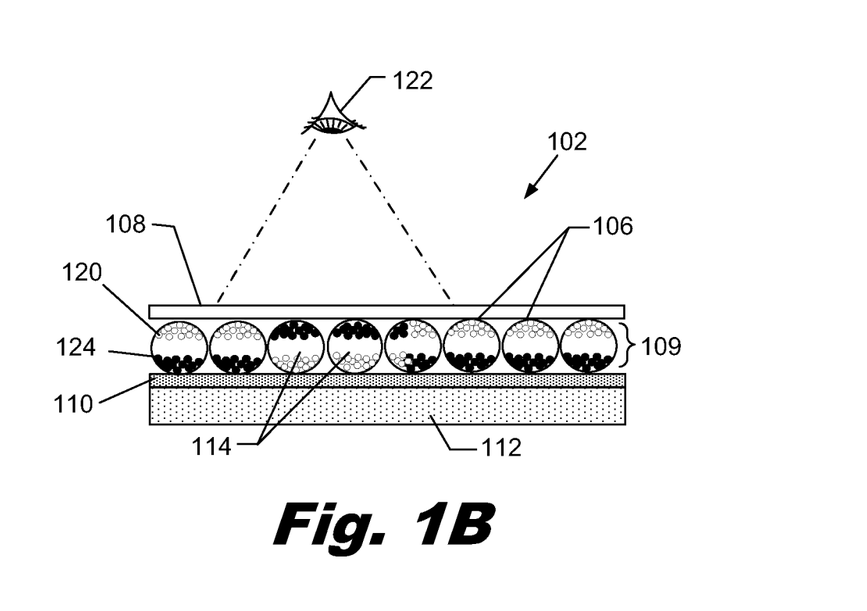
FIG. 1B is a cross sectional view of a portion of the electronic paper, according to one example of principles described herein.

FIG. 1B is a cross-sectional view of a portion of the e-paper 102 shown in FIG. 1A. The cross-sectional view shows an illustrative multilayer structure of the e-paper 102, including an active layer 109 with microcapsules 106, 114 sandwiched between a transparent charge receiving layer 108 and a conductive ground layer 110. As shown in FIG. 1B, the conductive ground layer 110 is disposed on a substrate 112.

In this example, each of the microcapsules 106, 114 contains both white particles 120 and black particles 124 suspended in a fluid medium. Ambient light is transmitted through the charge receiving layer 108, strikes the pigment, and reflected back to the viewer 122. When white particles 120 of a microcapsule are located near the transparent charge receiving layer 108, the microcapsule appears white to a viewer 122, and when the black particles 124 of a microcapsule are located near the charge receiving layer 108 the microcapsule appears black to the viewer 122. The particles can be of opposite charges. For example, the black particles 124 can be positively charged particles and the white particles 120 can be negatively charged particles. Various shades of gray can be created by varying the arrangement of alternating microcapsules with white and black particles located near the charge receiving layer 108 to produce halftoning.

The microcapsules 106, 114 are designed to exhibit image stability using chemical adhesion between particles and/or between the particles and the microcapsule surface. For example, the black and white microcapsules 106, 114 ideally can hold text and images indefinitely without drawing electricity, while allowing the text or images to be changed later.

The structure, materials, and dimensions of the various layers and components shown in FIG. 1B can be adapted to specific design criteria. In one implementation, the transparent charge receiving layer 108 can be composed of a transparent polymer and can range in thickness from approximately 100 nm to approximately 14 µm. The transparent charge receiving layer 108 can also be composed of a material that holds charges or is porous or semi-porous to charges and/or ions. The transparent charge receiving layer 108 can also be composed of a first insulating layer and second patterned conductive layer.

The microcapsules 106, described in greater detail below, can have a diameter of approximately 50 µm but may also range in diameter from approximately 20 µm to approximately 100 µm. The conductive ground layer 110 can be composed of a transparent conductive material, such as indium tin oxide, or an opaque conductive material and can have a thickness ranging from approximately 5 nm to approximately 1 mm. In one example, the layers 108, 109, and 110 have a total thickness of approximately 100 µm. The substrate 112 can be composed of an opaque or transparent material and can range in thickness from approximately 20 µm to approximately 1 mm, or the thickness can be much larger depending on the how the e-paper is used. The substrate 112 can be composed of polyester, plastic, or transparent Mylar. In some implementations, the substrate 112 can be omitted and the layers 108, 109, and 110 can be mounted on a wall or a product chassis. In this case, the transparent charge receiving layer 108 serves as a wear protection layer for the layer of microcapsules 109 and normalizes the e-paper surface, eliminating surface topography and blocking surface conduction paths on the microcapsule surfaces.

A variety of other configurations may be used. For example, the microcapsule 106 may include black particles suspended in a white colored fluid. The black particles can be positively charged particles or negatively charged particles. One or more microcapsules form a pixel of black and white images displayed on the e-paper 102. The black and white images are created by placing black particles near or away from the charge receiving layer 108. For example, the microcapsules 106 with black particles located away from the transparent charge receiving layer 108 reflect white light, corresponding to a white portion of an image displayed on the e-paper. By contrast, the microcapsules with black particles located near the charge receiving layer 108, such as microcapsule 114, appear black to the viewer 122, corresponding to a black portion of the image displayed on the e-paper 102. Various shades of gray can be created using halftoning to vary the arrangement of alternating microcapsules with black particles located near or away from the charge receiving layer 108.

Where the microcapsules include black particles suspended in a white colored fluid, the charge receiving layer 108 may be tinted with alternating blue, red, and green regions. Adjacent blue, red, and green regions form color pixels. Color images are created by placing different combinations of white or black particles near the charge receiving layer 108. For example, the microcapsules of color pixel with white particles located near the red and green regions of the transparent charge receiving layer 108 reflect red and green light from the e-paper. The viewer 122 will perceive this combination as a yellow pixel. When the black particles in the microcapsules are located near the transparent charge receiving layer 108, that color pixel will appear black to the viewer 122. Additionally or alternatively, the black particles 124 of each microcapsule are replaced by either blue, red, or green positively, or negatively, charged particles. Particles could be used alone or in combination with a tinted charge receiving layer 108 to create the desired color image.

Figure 2A:
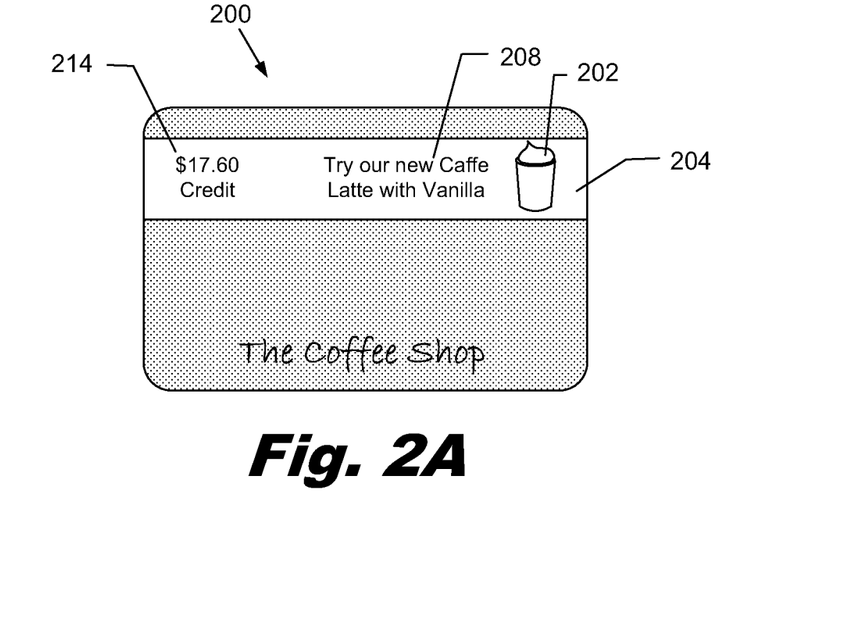
FIG. 2A and 2B are examples of illustrative e-paper applications, according to one example of principles described herein.
Figure 2B:
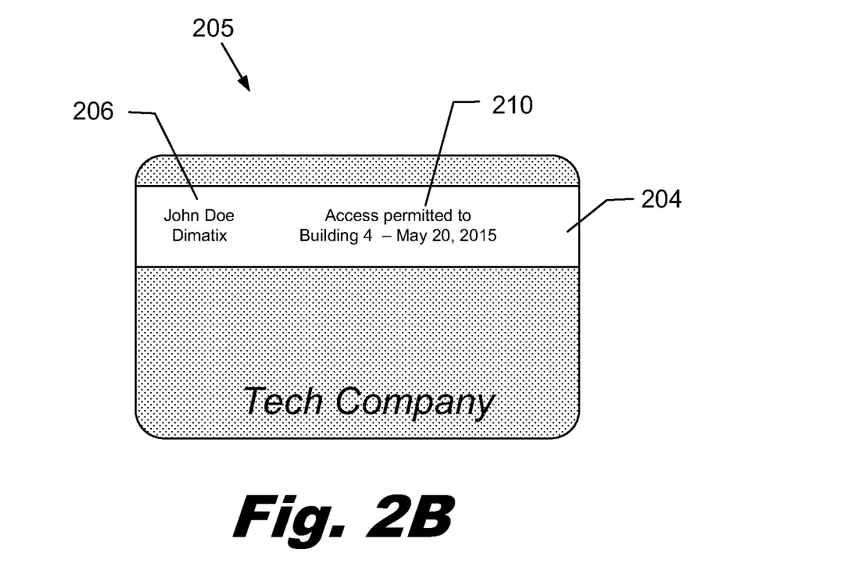

FIGS. 2A and 2B show two illustrative cards 200, 205 that use a strip of e-paper 204 across the width of the card to display information. As discussed above, it may be desirable to secure the information displayed by the e-paper against alteration. FIG. 2A is a gift card 200 used in a retail setting. The card 200 displays text 214 that communicates the amount remaining on the card 200. Additional text 208 and an image 202 describing a featured product are also included on the card 200. If the text 214 has not been secured against alteration, it cannot be relied on to accurately communicate the balance of the card. Consequently, other techniques such as a magnetic strip or embedded radio frequency circuitry may be included in the card to communicate the balance of the card.

FIG. 2B is a security card 205 that grants the user access to specific buildings for a predetermined period of time. The user's name 206 and access permissions 210 are printed on the e-paper 204. The use of e-paper 204 allows the user and others to visually identify the information that is associated with the card. However, if the e-paper 204 has not been secured against alteration, the text 206, 210 cannot be relied upon and alternative techniques are employed to communicate the identity of the card, the name of the card bearer and the access privileges of the card bearer.

Figure 3:
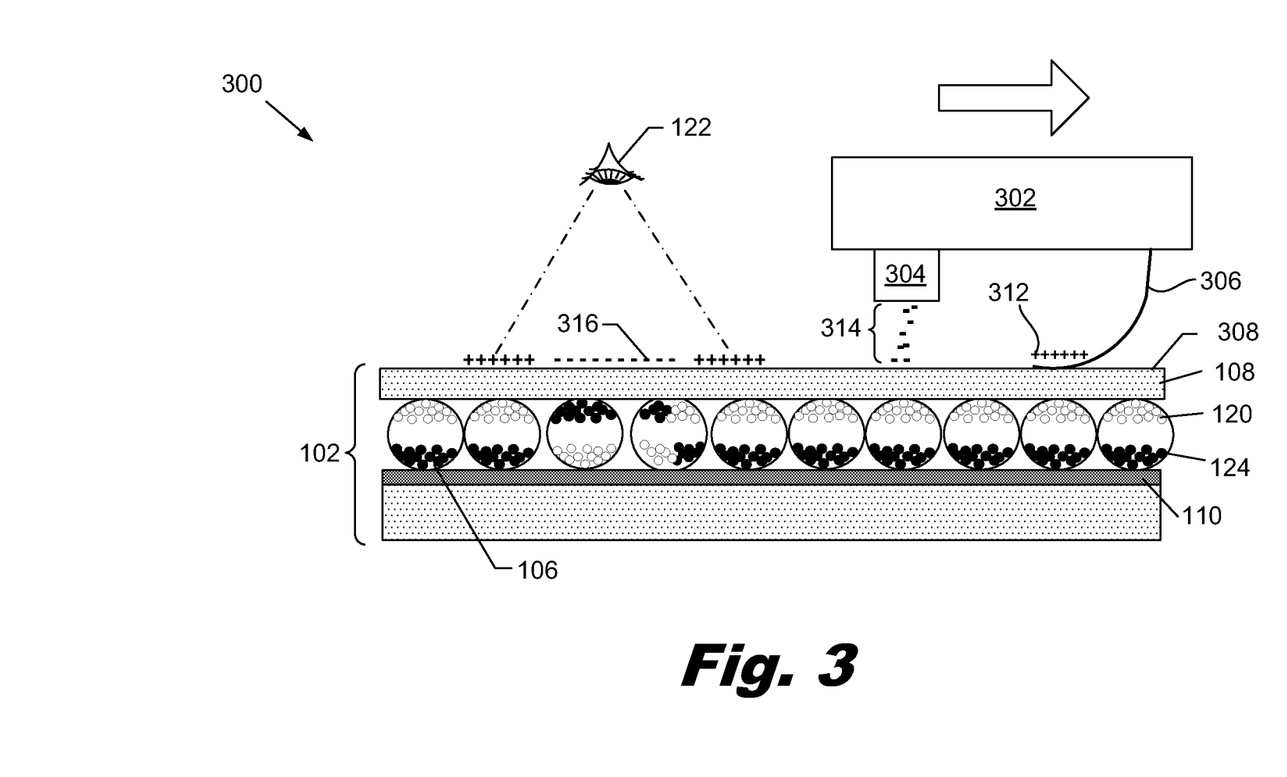
FIG. 3 is cross sectional diagram of an illustrative e-paper printing system, according to one example of principles described herein.

FIG. 3 describes writing to illustrative unsecured e-paper 102 with a writing system 300. The writing system 300 includes a writing module 302, writing unit 304, and an erasing unit 306. The writing unit 304 and erasing unit 306 are connected to the same side of the writing module 302 that faces the outer surface 308 of the charge receiving layer 108, with the writing unit 304 suspended above the surface 308. In the example of FIG. 3, the writing unit 304 is an ion head and the erasing unit 306 can be an electrode that comes into close contact with, or can be dragged along, the surface 308 in front of the ion head 304. The writing module 302 can be moved in the direction indicated by the arrow and the e-paper 102 can be held stationary; or the e-paper 102 can be moved in the opposite direction and the writing module 302 held stationary; or the writing module 302 and e-paper 102 can be moved simultaneously. In the example shown in FIG. 3, the black particles 124 and the white particles 120 of the microcapsules are positively charged and negatively charged, respectively. The erasing unit 306 erases any information stored in the microcapsules prior to writing information with the ion head 304. In the example shown in FIG. 3, as the e-paper 102 passes under the writing module 302, the positively charged erasing unit 306 can remove negatively charge ions attached to the surface 308. The positively charge erasing unit 306 also creates electrostatic forces that drive positively charged black particles 124 away from the charge receiving layer 108 and attract negatively charged white particles 120 toward the charge receiving layer 108. By passing the erasing unit 306 over the charge receiving layer 108, the information written to the e-paper 102 is erased by positioning the negatively charged white particles 120 near the top of the microcapsules and pushing the positively charged black particles 124 to the bottom of the microcapsules 106. Additionally or alternatively, a corona source or the ion head 304 could be used to erase prior images present on the e-paper.

FIG. 3 also shows an illustrative writing operation performed by the ion head 304. The ion head 304 is designed and operated to selectively eject ions 314 (shown as black bars) toward the charge receiving layer 108, when a region of the e-paper 102 located beneath the ion head 304 is to be changed from white to black. The ions 314 reach the surface 308 and remain on the surface to create negatively charged areas 316. The negatively charged white particles 120 are repelled and driven away from the negatively charged areas 316 on the charge receiving layer 108, while the positively charged black particles 124 are attracted to the negatively charged area 316 and driven toward the charge receiving layer 108. For example, as shown in FIG. 3, as the ion head 304 passes over a portion of microcapsule 106 while ejecting electrons/ions 314, the negatively charged white particles 120 are repelled away from the charge receiving layer 108 and the positively charged black particles 124 are driven toward the charge receiving layer 108. Thus, to a viewer 122, the positively charged areas of the charge receiving layer 308 will appear white and the negatively charged areas 316 will appear black.

In addition to ion heads, a number of alternative writing devices can be used to write on the e-paper or alter the contents of the e-paper. One of the simplest writing devices is a charged stylus that is manually brought into proximity with the charge receiving surface. The tip of the charged stylus creates an electromagnetic field which can influence the position of the charged pigments in the microcapsules 106.

In contrast to this relatively simple stylus, the use of an ion head 304 to write to e-paper is much more involved. The construction of the ion head 304 is exacting and requires specialized equipment. The operation of the ion head 304 includes computerized control and data transfer. The construction or use of an ion head 304 to forge or alter e-paper is a significant hurdle that many forgers may be unable or unwilling to implement.

Securing e-paper 102 against alteration by a charged stylus or other field writing device while allowing alteration by an ion head 304 can result in e-paper 102 being significantly more secure. Consequently, the visual information conveyed by the e-paper 102 could be relied on to a greater extent. This may reduce the need for alternative technology to be incorporated into the card. Further, the information conveyed by secured e-paper 102 could be used to visually verify the information conveyed by a magnetic strip, embedded microchip or other technology.

Figure 4:
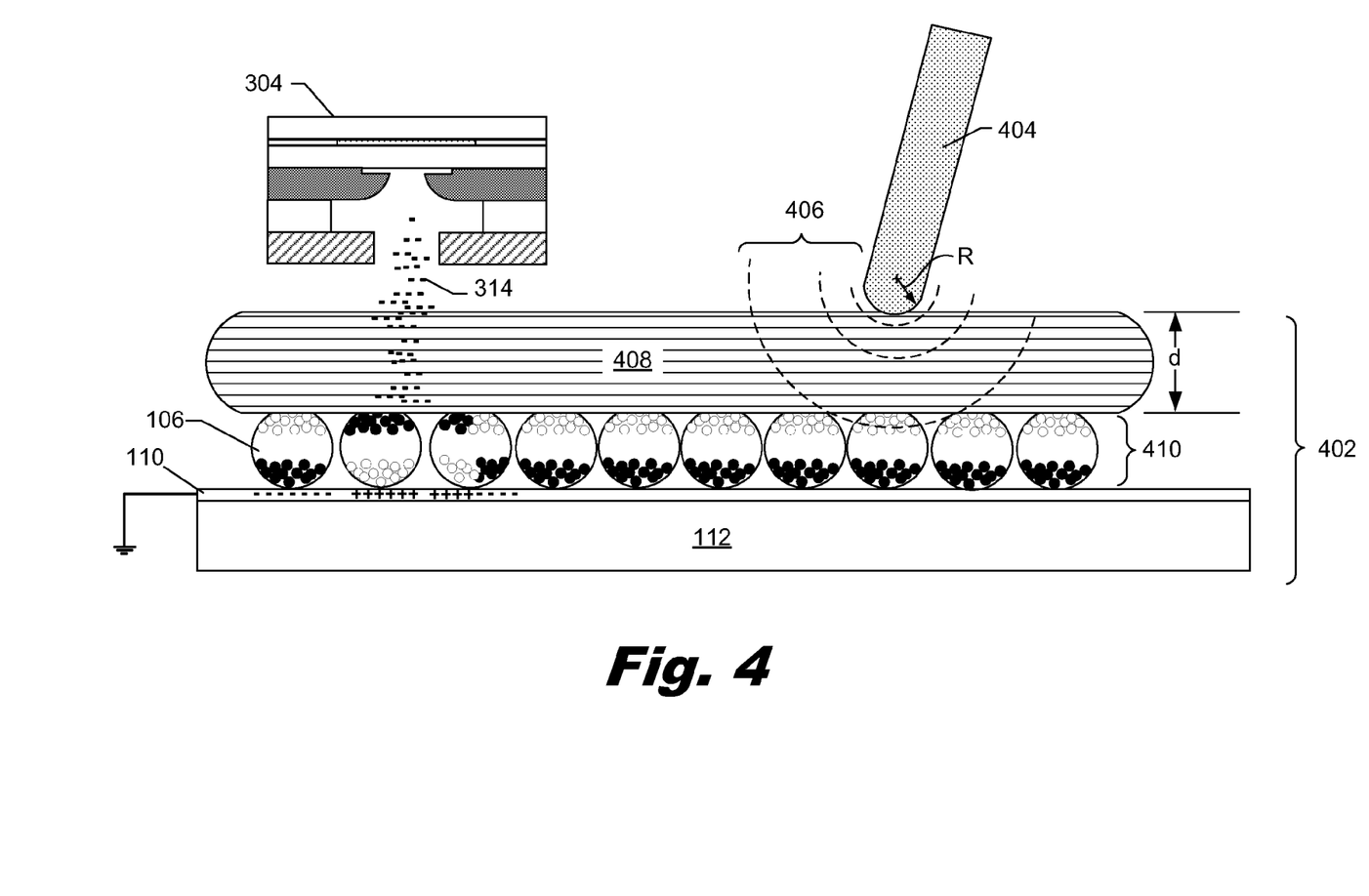
FIG. 4 is a cross sectional view of an illustrative e-paper structure which includes a porous standoff layer, according to one example of principles described herein.

FIG. 4 is a cross sectional diagram of an illustrative secure e-paper 402. The secure e-paper 402 includes a substrate 112, a ground plane 110, an active layer 410 that includes microcapsules 106, and a standoff layer 408 that imposes an electrical standoff distance while being permeable to free ions. This standoff layer 408 may be implemented in a variety of ways. In one implementation, the standoff layer 408 is formed from material that is porous at the appropriate length scale. For example, screen meshes that have porosity levels of approximately 60% and openings in the range of 0.0059" showed good imaging capabilities with a 300 dot/inch ion head while preventing image modification with a stylus at a 600 Volt potential.

FIG. 4 shows an ion head 304 positioned over the e-paper 402 and directing a stream of ions 314 toward the e-paper 402. A stylus 404 is brought into contact with the standoff layer 408 and equipotential lines 406 are shown emanating from the stylus 404, through the standoff layer 408 and into the active layer 410.

There are several differences between writing an image with an ion device 304 and a stylus 404. An ion beam 314 may be kept focused over long distances with a relatively small field (<1 v/μm to keep a 50 μm beam focused over lengths of 250-500 μm). However, the electrical potential generated by a stylus 404 rapidly becomes larger and weaker with distance. For example, the equipotential lines 406 generated by the stylus 404 are nominally spherical, so for a stylus of radius R kept at an offset d from the imaging plane (i.e. the imaging plane is where the dot will be formed), the spot diameter will be roughly ~2x(R+d). If the radius R of the stylus 404 is 50 μm and the thickness d of the standoff layer 408 is 50 μm, the effective spot diameter at the active layer 410 is roughly ~200 μm.

This is shown schematically in FIG. 4. In practice, the effect of the offset is slightly worse than the calculation given above or the illustrated equipotential lines shown in FIG. 4. This is because the proximity of the ground plane causes the equipotential lines to become flat at the ground plane 110. This further increases the spot size generated by the stylus 404.

To allow ion printing through the standoff layer 408, the standoff layer is porous. This allows the ion beam 314 to permeate the standoff layer 408 and directly influence the position of the charged pigments in the active layer 410. However, the physical offset will cause a much greater increase in the image spot from the stylus/styli 404. Further, the physical offset severely reduces the voltage potential created by the stylus 404. Consequently, using a stylus 404 in an attempt to alter an image in the secure e-paper results in vague, low resolution markings. In many instances, the stylus 404 will have no visible impact on the image at all.

The amount of porosity in the standoff layer 408 can be selected using a number of factors. Less porous surfaces have a tendency to accumulate charges from the ion head and cause an increase in spot size. However, a less porous standoff layers may be more robust and less prone to absorb contaminants. For example, the less porous layer may have fewer or smaller pores. A more porous standoff layer may permit the ion beam to pass more efficiently to the active layer.

The standoff layer 408 can be formed from a range of materials and have a variety of pore structures. In one implementation the porosity may be simple grain boundaries or micron scale pores, such as those encountered in anodized aluminum layers. In another implementation, open cell micro-foam of a suitable dielectric material could be formed over the active layer 410. Alternatively, a variety of printing and lithographic processes could be used to form a mesh structure over the active layer 410. For example, an impression die could be pressed into a dielectric coating in an uncured state. Another manufacturing method would be to etch a porous structure onto a solid film/coating. This porous coating would still provide a tough mechanical protection to the e-paper 402.

In addition to porosity, the resistivity of the standoff layer 408 can be important. For example, the resistivity of the standoff layer 408 can be between $10^8$ to $10^{14}$ ohm centimeters. This resistivity provides a layer time constant of no more than 10 seconds to eliminate reverse charging during handling after imaging and no less than 0.1 seconds to prevent lateral charge flow (blooming) during the e-ink switching time. In one example, the resistivity of the standoff layer 408 is between $10^{11}$ to $10^{13}$ ohm centimeters.

In other examples, the standoff layer 408 may exhibit macro-level porosity such as encountered in commercially available meshes with sizes between 60-325 openings per linear inch. In one implementation, mesh with between 100 to 180 openings per inch can be used. Mesh with 180 openings per inch has a filament spacing of approximately 140 μm and a filament diameter of about 70 μm. This creates a stylus spot size of approximately 140 μm plus the stylus diameter. To provide a high level of permittivity to the ion beam created by the ion head 304, it can be desirable to employ meshes having a high percentage of open area. Open areas of 60 percent are readily available and perform well. For example, nylon mesh may be used as the standoff layer 408. Nylon meshes have an electrical resistivity that ranges from between approximately $10^9$ to $10^{12}$ ohm centimeters depending on the processing conditions, additives and moisture content. When using these meshes as offset layers, writing to the e-paper 402 with a stylus 404 is ineffective and while writing to the e-paper 402 with an ion head 304 is relatively unimpeded.

The standoff layer 408 could be formed from a variety of materials. For example, the standoff layer 408 could be formed from a hydrophobic material or have a hydrophobic coating. This would protect the exposed surface of the standoff layer 408 from accumulating a potentially harmful layer of a liquid electrolyte such as sweat or atmospheric moisture. A number of additional layers may also be included in the e-paper 402. For example, a thin coating layer may provide a bond between the porous layer and the e-ink.

Figure 5A:
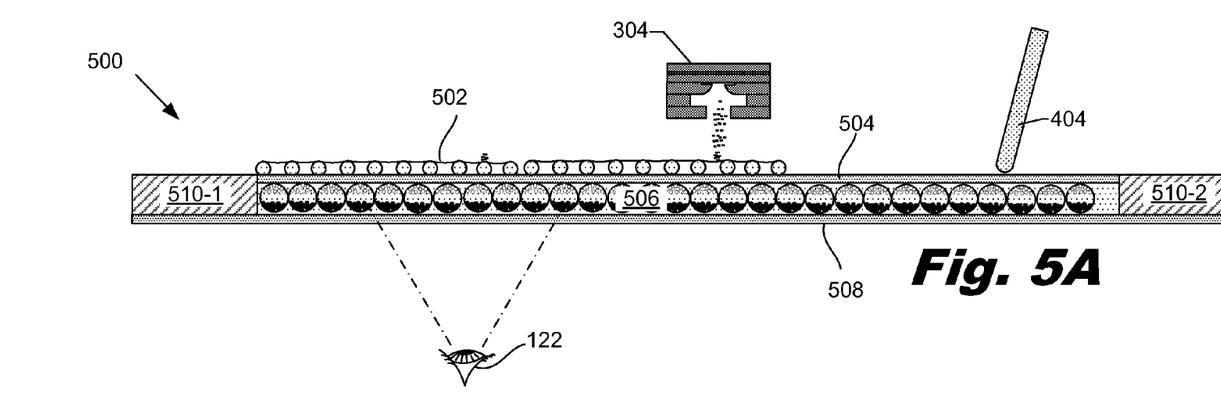
FIGS. 5A and 5B are a cross sectional view and a plan view, respectively, of an e-paper test coupon with a porous standoff layer, according to one example of principles described herein.
Figure 5B:
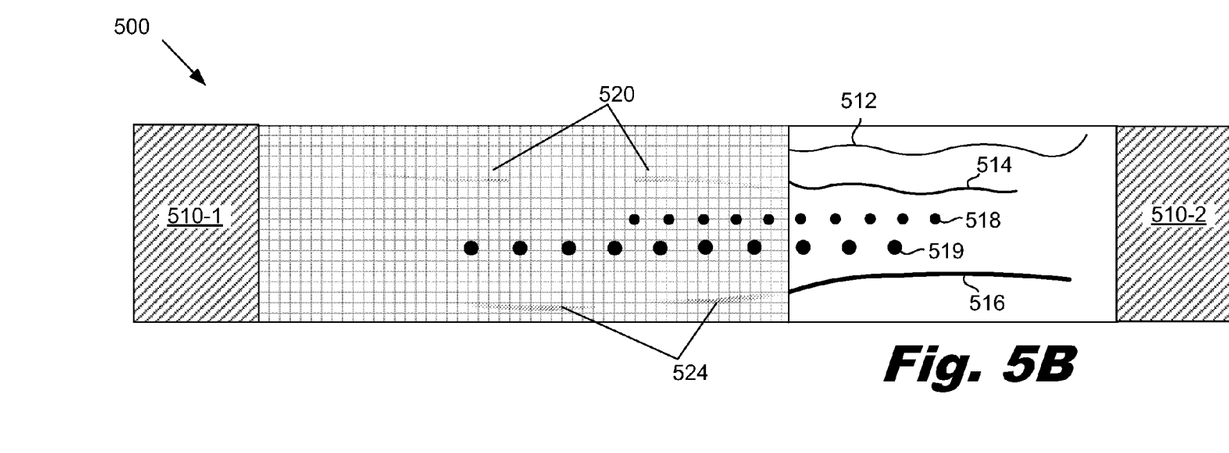

FIGS. 5A and 5B are illustrations of a 15 mm by 30 mm test coupon that was constructed and tested according to the principles described above. FIG. 5A is a cross-sectional view of the test coupon and FIG. 5B is a plan view of the viewing side of the test coupon.

As shown in FIG. 5A, the test coupon includes a ground layer 508, an active layer 506 that contains the microcapsules, and a charge receiving layer 504. The left hand portion of the charge receiving layer 504 has been covered by a nylon mesh standoff layer 502. Two electrodes 510 at either end of the test coupon 500 provide electrical contact with the ground plane 508.

To form the test coupon 500, microcapsules were deposited on the ground plane 508 to form the active layer 506. The charge receiving layer 504 was deposited over the active layer 506. In this example, the charge receiving layer 504 is formed using a white alkyd enamel paint deposited using a draw down bar. The coating gap was 62 microns and the dry coating thickness 75 microns. In some implementations, the charge receiving layer 504 may have semiconducting properties. For example, the charge receiving layer 504 may have an electrical resistance between $10^3$ to $10^{12}$ ohm-centimeters.

After a short drying period to set the paint, a 104 mesh (per inch) nylon screen was pressed into the coating 504 to form the standoff layer 502. The dry thickness in the screen area was measured to be 150 microns. The screen filament diameter is 0.0037 inch and the open gap 0.0059 inches on a side.

An ion print head 304 passed over both the exposed charge receiving layer 504 and the mesh standoff layer 502. The ion print head 304 deposited charges onto the charge receiving layer 504 as a row of dots. The ion print head 304 made two passes over the test coupon 500 resulting in two rows of dots. A first row of dots were formed using a pulse length of 50 microseconds.

A stylus 404 was also passed over both the exposed charge receiving layer 504 and the mesh standoff layer 502. In this example, the stylus 404 has a 0.5 mm diameter. During the first pass, 200 volts was applied to the stylus 404. During the second pass 400 volts was applied to the stylus 404 and on the third pass 600 volts was applied to the stylus 404. The marks made by the deposited charges are viewed from the opposite side as illustrated by the viewer 122.

FIG. 5B is a plan view of the viewing side of the test coupon 500. In this example, the viewing side looks through ground plane 508, FIG. 5A. FIG. 5B shows dot images 518, 519 made using the ion print head 304, FIG. 5A and lines made using the stylus 404, FIG. 5A. The mesh standoff layer 502 underlies the left side of the test coupon 500, while the right side of the test coupon 500 includes only white alkyd paint. Thus, the left side of the test coupon 500 is protected from alteration by a stylus, while the right side of the test coupon 500 is not.

The images 512, 514, and 516 formed by the stylus 404 in FIG. 5A are very distinct on the right side of the test coupon 500. The line 512 made by the stylus 404, FIG. 5A with an applied voltage of 200 volts is relatively thin. The line 514 made by the stylus with an applied voltage of 400 volts is thicker and the line 516 made by the stylus with an applied voltage of 600 volts is the thickest line. However, as the lines pass onto the left side of the test coupon 500, the lines disappear or become faint smudges 520, 524. There is no trace of the thinnest line 512 on the left side of the test coupon 500. There are slight smudges 520 left by the stylus at 400 volts on the left side of the test coupon. The marks made by the stylus at 600 volts on the left side of the test coupon 500 are wider and somewhat better defined but still indistinct when compared to those made on the unprotected right hand side of the test coupon.

A first row of small dots 518 were formed by the ion head 304 using pulse lengths of 50 microseconds and have a diameter between 150 and 200 microns. The second row of larger dots 519 were formed using pulse lengths of 150 microseconds and have a diameter of approximately 250 microns. In contrast to the lines 512, 514, 516, the dot images 518, 519 are clear and distinct on both the right and left hand portions of the test coupon 500. This clearly demonstrates that the mesh standoff layer 502 is effective in preventing useful marks from being made with the stylus 404, FIG. 5A while allowing the ion head 304, FIG. 5A to print well defined marks.

In conclusion, the incorporation of a standoff layer provides security against undesirable rewriting of electronic paper. This allows the electronic paper to be used in a variety of more secure applications. The implementation of the secure coating is a low cost solution that is readily scalable to large scale production. Further, the standoff layer may also make images on the e-paper more durable and resistant to handling.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An electronic paper device comprising:
    a ground plane;
    a charge receiving layer;
    a porous standoff layer disposed over the charge receiving layer; and
    an active layer interposed between the ground plane and the charge receiving layer, the active layer comprising a plurality of microcapsules containing charged pigments,
    wherein the porous standoff layer passes ions from an ion beam to the charge receiving layer, the ions producing visible migration of charged pigments, and
    the porous standoff layer prevents a corona discharge from producing visible migration of charged pigments.

2. The device of claim 1, wherein the porous standoff layer prevents a stylus with a 200-volt potential relative to the ground plane from producing visible migration of charged pigments.

3. The device of claim 1, wherein use of a stylus to produce visible migration of charged pigments in the microcapsules results in a greater minimum spot size than use of an ion beam to produce visible migration of charged pigments in the microcapsules.

4. The device of claim 1, wherein the porous standoff layer is non-conductive.

5. The device of claim 1, wherein the porous standoff layer is an insulator.

6. The device of claim 1, wherein a majority of a volume of the porous standoff layer is occupied by gas.

7. The device of claim 6, wherein the porous standoff layer comprises a polymer.

8. The device of claim 1, wherein a microcapsule contains multiple colors of charged pigments.

9. The device of claim 1, wherein adjacent microcapsules contain charged pigments of different colors.

10. The device of claim 9, wherein a tool produces visible migration of charged pigments in a first microcapsule containing charged pigments of a first color but does not produce visible migration of charged pigments in a second microcapsule containing charged pigments of a second color, the second microcapsule being adjacent to the first microcapsule.

11. The device of claim 10, wherein the tool is an ion beam.

12. The device of claim 10, wherein application of a charged stylus produces visible migration of multiple colors of charged pigments.

13. A system for writing information to electronic paper comprising:
a ground plane;
a non-conductive standoff layer; and
an active layer comprising a plurality of microcapsules containing charged pigments, the active layer being disposed between the ground plane and the non-conductive standoff layer,
wherein a thickness of the non-conductive standoff layer is greater than a diameter of the microcapsules, such that a voltage applied between a point on an outer surface of the non-conductive standoff layer and the ground plane produces visible migration of charged pigments in multiple microcapsules.

14. The system of claim 13, wherein adjacent microcapsules contain charged pigments of different colors.

15. The system of claim 13, wherein a ratio of the thickness of the standoff layer to the diameter of the microcapsules is from 2:1 to 5:1.

16. The system of claim 13, wherein the non-conductive standoff layer is permeable to ions from an ion beam.

17. An electronic paper device comprising:
a ground plane;
a charge receiving layer;
a standoff layer disposed over the charge receiving layer; and
an active layer interposed between the ground plane and the charge receiving layer, the active layer comprising a plurality of microcapsules containing charged pigments,
wherein the standoff layer is permeable to ions of an ion beam, and
the standoff layer impedes contact between a stylus and the active layer.

18. The device of claim 17, wherein the standoff layer is a mesh.

19. The device of claim 17, wherein the standoff layer is a polymer foam.

20. The device of claim 17, wherein the standoff layer is hydrophobic.

* * * * *